Feb. 27, 1951          K. G. McKAY                2,543,039
              BOMBARDMENT INDUCED CONDUCTIVITY
                    IN SOLID INSULATORS
Filed Dec. 4, 1947                              2 Sheets-Sheet 1

INVENTOR
K. G. McKAY
BY
ATTORNEY

Feb. 27, 1951  
K. G. McKAY  
BOMBARDMENT INDUCED CONDUCTIVITY  
IN SOLID INSULATORS  
2,543,039

Filed Dec. 4, 1947  
2 Sheets-Sheet 2

INVENTOR  
K. G. McKAY  
BY  
*Guy T. Morris*  
ATTORNEY

Patented Feb. 27, 1951

2,543,039

UNITED STATES PATENT OFFICE 2,543,039

BOMBARDMENT INDUCED CONDUCTIVITY IN SOLID INSULATORS

Kenneth G. McKay, Summit, N. J., assignor to Bell Telephone Laboratories, Incorporated, New York, N. Y., a corporation of New York Application December 4, 1947, Serial No. 789,667

15 Claims. (Cl. 250—83.3)

1

This invention relates to bombardment induced conductivity in solid insulators and to applications thereof in the electrical arts. It may be perhaps best regarded as an improvement over the invention of D. E. Wooldridge, Serial No. 747,888, filed May 14, 1947, now Patent 2,453,131, the improvement consisting largely in the use of an alternating rather than a direct voltage field across the bombarded solid insulator in question, together with bombardment of said insulator during all, or a part, of both positive and negative half cycles of the alternating voltage. Another expedient is also suggested later in this statement of invention for achieving a like effect, namely the use of a very thin solid insulator in conjunction with a very high field across the same.

The significance of this improvement will be more evident from the further elaboration of the prototype Wooldridge invention, in the statement of invention herein, and from the explanation herein of the results of the use of the alternating voltage field and of the alternative expedients of the invention with respect thereto. It may be said, in anticipation, that the use of the alternating voltage or its above alternative, of the invention, is believed to be justified in every application of the basic Wooldridge principle of bombardment induced conductivity. It is also true that the improvement over the Wooldridge basic invention represented by the present invention is without regard to the particular kind of radiation concerned, so as therefore to be applicable to the use of alpha particles, beta particles, electrons, mesons, X-rays or gamma rays, among others.

The phenomenon of bombardment induced conductivity in solid insulators is an instance of valve action. Analogously as a vacuum tube is made conducting under the influence of electrical means independent of the voltage applied between the electrodes, in the present studied phenomena a normally insulating solid material is made conducting by the incidence of bombarding charged particles under control of conditions specific to the bombarding function rather than to the electric field induced by the electrodes bounding said solid insulator.

Similarly as a charged particle of a conventional type, as alpha, beta or electron particles, of sufficient energy can remove a valence electron from its bonds as taught in this statement of invention and in the Wooldridge application, so also units (photons) of electromagnetic radiation, as in X-rays and gamma rays, may possess

2 sufficient energy to cause the removal of valence electrons from their bonds in such a way that the solid insulator is rendered temporarily conducting.

The bombarding particles penetrate the insulator, causing a disruptive separation of the positive and negative charges specific to the atoms which are affected by said bombarding particles. These charges are drawn toward the electrodes by the potential therebetween, which sets up an electric field in the insulator; this motion of charges constitutes a conduction current which may be suitably amplified and measured by conventional apparatus. The concepts involved in a theoretical discussion of this problem are derivable from the early part of a paper by W. Shockley "The Quantum Physics of Solids" beginning in page 645, volume XVIII (1939) of Bell System Technical Journal. They are elaborated, somewhat more than would be justified in the present specification, in the above Wooldridge application.

The material chosen for the solid insulator should have a high insulating characteristic so as to be most amenable, without ambiguity, to the conditions imposed by the type of phenomena being treated. To this end, and for other reasons as well which are not fully known at this time, the insulator should have preferably good insulating qualities, and also should be preferably of a single crystal type with a high degree of chemical purity and freedom from inelastic strain or other crystal defects. These considerations commend the use of diamond, quartz, zinc sulfide, the alkali halides (including potassium chloride and potassium bromide), magnesium oxide, calcium fluoride, sodium nitrate, topaz, silver chloride, orthoclase, beryl, calcite, apatite, selenite, tourmaline, emeralds, extremely pure silicon carbide, and stibnite. Several of these substances, notably diamond, zinc sulphide, magnesium oxide, silicon carbide, and stibnite, have been used in the basic studies of bombardment induced conductivity and there is every good reason to think that the feature of using an alternating voltage field, attributable to applicant, is applicable to each of them. He has used this feature of his invention with eminent success with a diamond insulator, using electrons as the bombarding paritcles. Alpha particle bombardment of diamond, zinc sulphide and magnesium oxide also has been used in the basic work in this art and applicant has found that the operation is improved by the use of the alternating voltage field of his invention, and has excellent reason to think that a similar improvement would be obtained under beta or meson particle bombardment, and under irradiation by X-rays and gamma rays.

Diamond is a favored solid insulator for this work because it can easily be obtained without sufficient impurities or imperfections to affect its high insulation resistance, or its conducting properties under bombardment. The carbon atoms therein consist each of a nucleus exhibiting fixed units of positive charge, to which two electrons are tightly bound. This core is surrounded by four valence electrons. The nucleus weighs twenty-two thousand times as much as an electron. The carbon atoms are held together by "electron pair bonds" between adjacent atoms. The insulation resistance is high because the electron bonds are very tight. As a result of this tightness very few electrons are displaced from their bonds by thermal agitation. This is not the case in, for example, metals, where a large number of electrons are continuously being displaced by thermal agitation and are relatively free to wander through the metal. This, under adequate conditions, constitutes the usual current in a metallic conducting medium.

When charged particle bombardment removes a valence electron from its bonds in an insulating target, producing a deficiency of one electron in the atomic structure immediately affected, this localized electron deficiency is called a "hole." Under an applied electric field the arrangement of the electrons is changed, and the location of any given hole will change. As a consequence, the hole may be conveniently regarded as a positive particle which is free to move, under the influence of the field. Similarly the electron freed from the bond in question constitutes a negative particle which is free to move under the influence of the field. If there is no applied field, any free electron or positive hole moves in virtue of thermal agitation and consequently has a completely random motion. Under an applied electric field there is a directional motion superposed upon the random one. The order of mobility of the electrons in diamond is 1,000 centimeters per second for a field of one volt per centimeter. For a field of $10^4$ volts per centimeter the velocity therefore is $10^7$ centimeters per second. For a diamond crystal one millimeter thick the transit time therefore would be $10^{-8}$ seconds. The mobility of the electrons is affected by the number of "traps," that is the presence of foreign atoms or imperfections, in the crystal. If an electron gets into a trap, it takes a greater or less amount of time to get out, depending upon the thermal energy required. If the time which a free electron spends moving in the crystal before being trapped is, on the average, less than the transit time, many of the electrons freed by the bombarding particle, will effectively move only part of the distance through the crystal and thus will not actually be collected on an electrode. Although this movement of charge through part of the crystal will contribute to the total observable conduction current, the contribution will be less than of the electrons had been collected on an electrode. Similar considerations concerning mobility and trapping also apply to conduction by positive holes. In order to minimize the number of effective traps in a given target, so as to realize a substantial conductive current, the length of path in the target, between the electrodes, should be made as small as possible. Also, because of the effect of the field of the free positive charges in the target, on the correspondingly free electrons, which tends to counterbalance the pull of the superposed field from the electrodes, said field should exceed a threshold value dependent on the precise conditions; that is, the potentials, whether direct or alternating, between said electrodes, should exceed a threshold value.

Consistently with the above and with further consideration to be recited later in this statement of invention, the object of this invention is to increase the effectiveness of bombardment induced conductivity in solid insulators by bombardment with charged particles, above that obtainable by use of a direct potential difference (voltage) across the insulators, as disclosed in the Wooldridge application. As in accordance with the invention in one aspect, an alternating, instead of a direct, potential field is used. In another aspect of the invention, the yield is increased by use of a very thin insulator crystal in conjunction with a very high field, for the same purpose. It should be understood that this purpose, namely to overcome the effect of space charge, is that subserved by the above use of alternating instead of direct voltage.

The above object extends to each and every field of usefulness of the Wooldridge prototype principle by increasing the effectiveness of bombardment induced conductivity in each of said fields. Some of the characteristics of bombardment induced conductivity, using this prototype principle, and therefore where enhanced effects can be achieved by the use of alternating voltages, are as follows:

(1) Where used for amplification, there is inherently greater amplification than by alternative means, as for example a conventional electron amplifier.

(2) When used to replace a Geiger-like counter (said Geiger counter utilizing a gas instead of a solid insulator) the principle of the invention makes possible the use of lower voltage, smaller size, higher directional resolving power, higher density of atoms affected and therefore a higher responsive effect, a higher counting speed, and absence of such absorption of charged particles or radiation as occurs in the glass wall of conventional gas-filled counting devices.

A satisfactory theoretical picture explanatory of the advantages derived from the use of alternating, as compared with direct voltages, as in accordance with the invention, is not now completely available. It is, of course, recognized that such an explanation, or a physical picture of the operation in question, is not necessary to support the present specification and claims, under the patent statutes. However, it is evident that the adverse condition which tends to be, and is, remedied by the use of the alternating voltage across the solid insulator electrodes, is of the nature of a polarization or a space charge; that is, an accumulation of a net excess of either positive or negative electrical charge in a certain region or regions of the crystal. The following rough hypothesis, which is amply justified by observations so far, may be helpful.

Immediately after applying a steady voltage, as in the prototype organization, most of the electrons which are freed by bombardment of the surface layer just beneath the thin cathode (negative electrode) move through the crystal from their point of origin near the cathode and are collected on the anode (the other electrode). However, some do not. Presumably these latter are trapped, and rendered temporarily immobile, by imperfections or impurity atoms in the body of the crystal. Electrons therefore tend to accumulate in regions of the crystal other than the very thin layer near the bombarded surface where they are freed. This is true, of course, without regard to whether the electrodes are in side-by-side presentation or in opposite presentation, with respect to the intervening crystal body. The crystal is then said to be polarized, that is, this accumulation of negative charges in the region between the source of the electrons and the anode opposes the force of the latter in attracting electrons away from this source. This effect is cumulative so that with the passage of time newly freed electrons are unable to move far from their source and only a small conduction current is observed. It is in this sense that the effective yield of internally freed electrons is observed to be relatively low with a steady voltage across the crystal.

This undesirable situation is disturbed if the applied voltage is reversed and the crystal is again bombarded. Now positive holes, instead of electrons as before, move across the crystal toward the back contact of the crystal which, before, constituted the anode but after reversal of the voltage would tend to function as the cathode. Some of these are trapped, similarly as the electrons in the earlier phase, thus setting up a positive space charge or polarization tending to neutralize the negative charge or polarization of the first phase, although some of the incomplete atoms which give rise to the positive holes may actually recombine with the trapped electrons. In either case, the negative space charge set up by the trapped electrons is greatly reduced or eliminated and the further reversal of applied voltage to restore the initial phase will thus cause newly freed electrons to move across the crystal until the opposing space charge again begins to form. Thus if an alternating voltage of sufficiently high frequency be applied across the crystal in the bombardment, there is not time for an appreciable space charge to accumulate before the voltage is reversed and the space charge is partially or completely neutralized. Hence the effective yield of electrons is relatively large at all times when the applied voltage is such as to cause them to flow across all, or an appreciable part, of the crystal, providing this voltage alternates at a sufficiently high frequency. It has been determined that under certain experimental conditions a frequency of 20 cycles or greater is adequate.

For optimum space charge neutralization, the extent of the primary bombardment, both in time and intensity, during the negative half cycle of the alternating voltage, must be adjusted with relation to the extent of the primary bombardment during the positive half cycle. It may further be desirable to use a direct potential bias superposed on the alternating voltage, since this would render the peak voltages of the positive and negative half cycle different in absolute magnitude. This tends to result in a more homogeneous neutralization of the space charge throughout the thickness of the crystal; the reason for such a bias, at least so far as concerns this latter effect, being of course based on the difference between electrons and positive holes in their probability of being trapped.

Throughout the above discussion, it is assumed that the penetration of the primary bombarding particles is negligible. However, in a sufficiently thin crystal this is not true and the current flow from the point of origin back to the bombarded crystal face becomes important. The above argument still applies to this condition, however, except that account of course has to be taken of the current implied by the return of electrons or positive holes from their points of origin back to the bombarded face.

The line of argument above is equally relevant to all of the specific applications to be disclosed in detail below. It must be emphasized that the use of the term "alternating voltage" should be interpreted in its broadest sense as applying not only to a sinusoidal wave form but also to other recurrent wave forms such as square waves or more complex forms. The principal requirement on the field appears to be that at a certain critical time the field across the crystal must be in a certain direction and that at some later critical time, the field should be in the opposite direction, these times being correlated with the extent of primary bombardment. The choice of types of alternating voltage wave forms becomes significant for example in the application of an alternating field to a crystal bombarded by alpha particles. Because of the random distribution in time of the alpha particles, sinusoidal modulation is not particularly applicable although square wave modulation is found to be very useful.

Another method of overcoming the effects of space charge, also a part of this invention, is to use very thin crystals in conjunction with high fields applied across the same. Of course for added effect the field may be an alternating voltage field. It is contemplated that an extremely high field across the thin crystals might actually nullify the effects of space charge, even when the field is a direct voltage field. For example, a field ranging as high as that which will cause dielectric breakdown under bombardment (of the order of $10^6$ volts per centimeter) might be applied between electrodes separated by from $10^{-4}$ to $10^{-3}$ centimeters. In this case such a field would be so large that, even if all the traps in the crystal were full, the resulting opposing space charge field would be small by comparison.

With reference to the use of alternating voltage with electron bombardment induced conductivity, it is desirable to estimate the order of magnitude of alternating voltage and frequency that can be applied across the crystal and be expected to yield useful results. The figure of 20 cycles per second above suggested is in contemplation of the use of diamond as the crystal substance, although there is reason to think that comparable values would pertain to other solid insulators adaptable for this purpose. The same is true of the figures now to be presented.

The limits to be imposed on the voltage and frequency tend to be functions of the bombarding current, the induced conduction current, and the geometry of the crystal. Nevertheless, it would appear feasible when using small values of the above currents to go down to frequencies of a few cycles per second, that is, considerably less than the above indicated 20 cycles per second. The upper frequency limit will probably be determined by the electron transit time between the electrodes. Thus frequencies of the order of $10^8$ cycles per second are certainly practicable and probably frequencies of as large as $10^9$ cycles per second could be used. Usable field strength across the crystal will probably have a lower limit of the order of $10^3$ volts per centimeter. The upper limit will probably be set by dielectric breakdown of the crystal, which would tend to occur at around $10^6$ volts per centimeter. In terms of practicable crystal electrode separation, the actual applied voltages should range from something less than 100 volts up to several thousand volts. The useful bombarding voltage range, that is, range of energies of primary electrons, will probably run from something less than 1,000 volts up to many kilovolts. Applicant and his confreres commonly used from 10 to 15 kilovolts, although there is reason to think that it would be practicable to go to very much higher voltages.

Other objects and teachings of the invention are derivable from the detailed description hereinafter following, with reference to the accompanying drawings in which.

As has been said, the incident ray or beam which produces, by bombardment thereof, induced conductivity in a solid insulator (diamond or the like), may almost impartially be made up of any one of various common types of radiation. This includes ordinary electrons as typified by cathode emanations in the usual electronic devices, beta particles which are essentially high speed electrons, and alpha particles which are positively charged particles. Alpha and beta particles usually, and as contemplated by the present disclosure, emanate from radioactive material. It should be understood also that circuits or systems for evidencing the fact of bombardment induced conductivity do not differ in concept depending on whether the ultimate result is a graphical showing of the conductivity, as on the oscillograph screen, or a response in a device for obtaining a quantitative measure of the incidence of the beam of charged particles. This is true although certain figures of the drawings are so differentiated in order to indicate such choice of means in the interest of special considerations.

Figure 1:
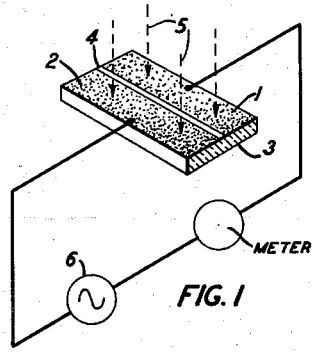
Figs. 1 and 2 illustrate two preferred methods of applying the necessary alternating difference of potential (alternating voltage) to the surfaces or parts of surfaces of the insulators in question, with relation to the incidence of the bombarding particles.
Figure 2:
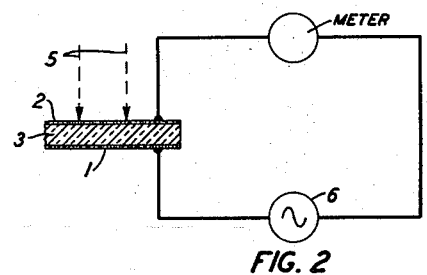

The foregoing generalization also applies to the particular electrode systems and Figs. 1 and 2 illustrate two kinds of electrode systems that may be almost impartially used in any of the systems above described, although a particular choice may be urged by particular practical considerations. These two systems differ in the nature of the coupling of the electrodes to the solid dielectric substance on which they are superposed. In Fig. 1 the two electrodes are mounted in a side-by-side presentation on the same surface of the solid insulator in question, which will be here assumed similarly as in other figures unless specific notice is given to the contrary to be a diamond and therefore so that the conduction current flows only near the bombarded surface of the diamond, whereas in Fig. 2 the electrodes are mounted on opposed surfaces of the diamond so that the conduction current represents a phenomenon existing throughout the mass of the diamond.

Referring to Fig. 1 more specifically, two conducting metal film electrodes 1 and 2 are mounted on one surface of the insulator 3. The gap 4 separating the electrodes is relatively small and various widths from .001 to .008 inch have been successfully used in bombardment induced conductivity tests.

These electrodes may be prepared by dividing the diamond surface roughly in half by stretching a wire of appropriate diameter across and in close contact with the surface and then evaporating a conducting metal layer, in vacuum, onto said surface. This layer can be made so thin as to be semitransparent, provided its electrical resistance is so low as not to affect its electrical performance unfavorably. The shadow cast by the wire provides a gap when the wire is removed. This gap would have constant width and represent a uniformly high resistance thereacross at any point.

The charged particles are assumed to conform to a ray or beam indicated generally by reference numeral 5, which beam is incident on the diamond surface. Of course the beam tends to be most effective where it is incident on the diamond surface at the gap but, depending on the type of charged particles, the electrodes would not necessarily impose a substantial barrier; however, the electrode system of Fig. 1 requires that the bombarding particles strike the gap or very closely adjacent thereto. Later numbered figures will show, most specifically and in detail, organizations including the elements which are here shown to a large extent diagrammatically. The angle of incidence is not critical.

Moderate alternating voltages applied between these electrodes by source 6 produce relatively high alternating electric fields in the top surface layers of the diamond and the resultant induced conductivity pulses observed in the indicating means, which is diagrammatically indicated as a meter, pass across only these surface layers. In the statement of invention above, certain quantitative values, or their criteria, have been indicated, this applying not only to this figure but to the other figures as well.

Fig. 2 presents a second type of electrode placement. Here the electrodes 1 and 2 are placed on opposite sides of the diamond 3. A typical diamond specimen for this purpose might be about one-quarter inch in either principal dimension and about .020 inch thick. Thus a potential difference of 100 volts from alternating voltage source 6, across these electrodes, will produce a uniform electric field of about 2,000 volts per centimeter throughout the body of the diamond.

In this type of electrode placement the induced conductivity pulses, observed in the meter indicating device shown, pass in alternate directions through the body of the diamond as distinguished from the Fig. 1 placement in which the pulses pass in the region of the front surface and alternately in directions along said surface.

Figure 3:
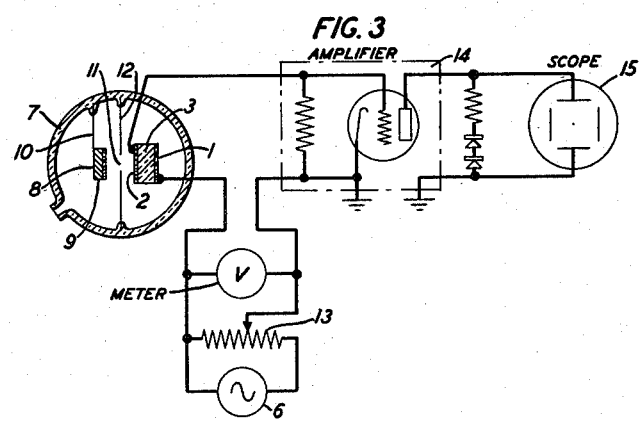
Fig. 3 illustrates a system of the invention for indicating the presence of conductivity in an insulator which is affected by the bombardment of charged particles.

In Fig. 3, illustrating a practical embodiment of a system operating according to the principles enunciated with respect to Figs. 1 and 2, like elements are, again, designated by like reference characters. The diamond 3 is coated with metallic electrodes 1 and 2 as in Fig. 2. The whole is mounted in an evacuated receptacle 7. The charged particle source 8, first assumed as the source of alpha particles, may consist of a silver sheet 9 on which is deposited a layer of radium sulphate having a given density of radium atoms (in a typical instance, 12 micrograms of radium per square inch). Of course other sources of alpha particle emanations are well known in the art and may impartially be used in the Fig. 3 organization. In fact said organization may well be used to explore the possibilities as to new sources of said emanations. The reference numeral 10 indicates diagrammatically a support for the silver sheet. In the prior art there are adequate teachings of mountings similar to this and the other elements here disclosed in an evacuated container. Other facilities, likewise taught by the prior art, could be used to advantage, such as a magnetic control means to determine the particular direction of incidence of the particles on the diamond, or even to adjust the position of the alpha particle source in apposition to the aperture 11 in diaphragm-like element 12 for further determining and limiting the precise coaction of the beam of charged particles and the diamond.

The same illustration is applicable to the use of a beta particle source and in this instance the element 9 could have the form of a piece of glass on which a minute quantity of artificially radioactive strontium has been deposited. The same teaching extends, of course, to other sources of charged particles or electromagnetic radiation such as gamma or X-rays.

In this figure the alternating current source 6 functions similarly as the like numbered source in Figs. 1 and 2 to apply the desired voltage across the diamond, that is, between the electrodes thereof. To suit the teaching of this figure, which discloses a more elaborate and complete organization than that of Figs. 1 and 2, the potentiometer 13 may be used as shown to determine a desired fractional part of the voltage of the primary source, the voltage impressed therefrom being indicated by the voltmeter V. Of course in the specific instance of Fig. 3, the bombarding particles penetrate the exposed electrode before affecting the diamond, this of course not representing a significant departure from the alternative in which the diamond is directly bombarded, providing this electrode be sufficiently thin. The detecting circuit may comprise amplifier 14 and cathode-ray oscilloscope or the like 15, both shown diagrammatically to suggest the comparatively impartial choice of specific means to achieve these functions.

It is not a rigid requirement that the container be evacuated. In practice, a rough vacuum is produced merely to eliminate small induced conductivity pulses caused by ionization of the air produced by the charged particles in their transit to the diamond. These small effects may alternatively, or in cooperation with the use of a vacuum, be largely eliminated by mounting the particle source as close as practicable to the diamond, this therefore requiring that the diamond 3, source 8 and diaphragm 12 all be very closely interspaced.

The above Wooldridge application, which discloses the prototype invention, illustrates actual oscilloscope records to show the efficacy of an organization like the present Fig. 3, without the alternating voltage feature for the quantitative measurements of bombardment induced conductivity of a diamond or the like, both as to the intensity of any given pulse and as to the number of pulses. The considerations there given are applicable to the instant case in amplified degree, as pointed out in the statement of invention herein. It was there stated that vertical cusps in the oscilloscope provide a measure of the intensity of any given pulse when the bombarded electrode is connected to the negative side of the source and that a reversal of the relative polarity of the electrodes caused a reversal of the pattern. The reversal of polarity at an adequate rate, thus implying the use of an alternating voltage source, results in the improved qualities of the organization that have been pointed out in the statement of invention.

Figure 4:
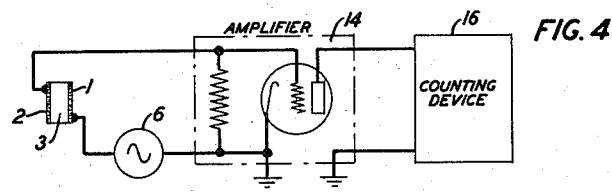
Fig. 4 illustrates a system similar to that of Fig. 3 for indicating the presence of bombardment induced conductivity in an insulator, here specifically an apparatus for actually counting the incident charged particles, not restricted to a particular type of source of bombarding particles.

Fig. 4 emphasizes the embodiment of the invention as a counter, alternatively, for example, to the well-known Geiger counter. Similar elements are similarly designated as in Fig. 3, the essential difference being the use of the counting device 16 in place of the oscilloscope 15 of Fig. 3, it being recognized that the prior art provides impulse (pulse) counters of a large variety and scope and having a greater facility for counting purposes than the oscilloscope of Fig. 3, although, as has been explained, it may be used quantitatively both to measure the intensity of any given pulse and the number of such pulses. A potential of the order of 200 or 300 volts may be applied across the diamond crystal. Of course solid insulators other than diamond crystal, within the spirit of the invention, may be used. The diamond crystal and electrode structure may be made to occupy a space each of whose dimensions is less than one-quarter of an inch. When this structure is exposed to the desired source of radiation, the particles from which are to be counted, the resultant current pulses which flow through the diamond each time a charged particle penetrates it are amplified as shown and the signals thus produced are counted by the device 16 which may be adjusted so that only pulses of a given amplitude or greater are selected for counting purposes.

Figure 5:
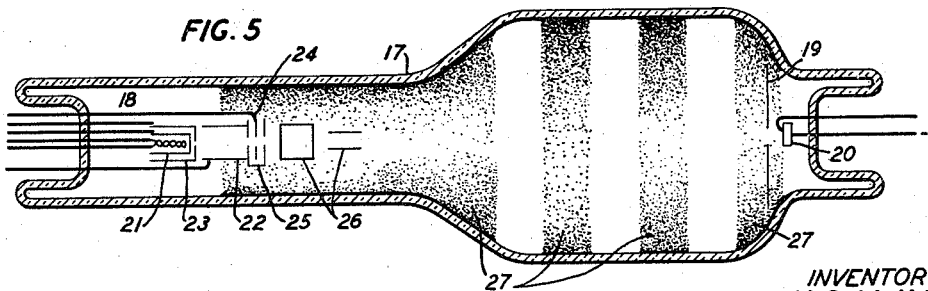
Figs. 5 and 6 illustrate the application of the bombardment induced conductivity principle of the invention to an amplifier, Fig. 5 illustrating the circuits and structures immediately associated with the bombardment inducing conductivity function and Fig. 6 illustrating an employment of these circuits and structures in a complete amplifier organization.
Figure 6:
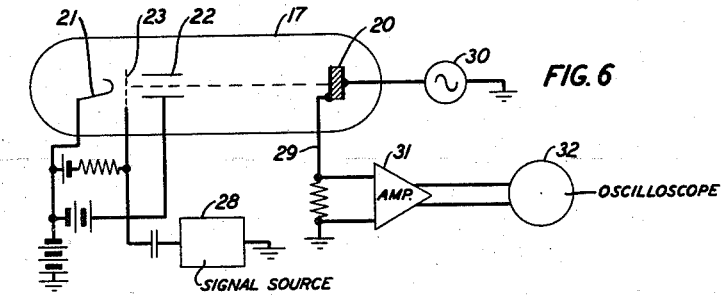

Figs. 5 and 6 illustrate an amplifier of the invention, therefore employing alternating voltage across the solid insulator which here is a diamond with an evaporated gold electrode on either face as the diamond is presented to the bombarding electrons. The amplifier may be considered as applicant's version of the prototype amplifier disclosed in Figs. 6 and 7 of the above Wooldridge application.

Fig. 5 discloses a vacuum tube with assembled amplifier elements which may be used in the organization of the invention, while Fig. 6 discloses the amplifier organization as a whole, which demonstrates the usefulness of the circuit and structure of Fig. 5 in the amplifying function. In Fig. 6 the elements of the vacuum tube of Fig. 5 which are specific to the functions of producing, conforming and accelerating the electron beam in question are shown in a simplified form and with the omission of the less essential elements, this only in the interest of a clearer disclosure of the organization as a whole and to emphasize the generality of the type of electron gun, and its immediately accessory elements, that may be employed. In this amplifier, while, as above stated, the diamond crystal electrode should be impressed by an alternating voltage, as in accordance with the invention, it should be understood that this should not be taken as specifying a particular alternating voltage wave form, since it may be sinusoidal, square wave, or of some other form of which there is a large choice. Similarly, it should be understood, without further specific statement as to same, that the signal to be amplified, and which is applied to the grid of Figs. 5 and 6 by the signal source of Fig. 6, may similarly be sinusoidal, a square wave, and the like; and more particularly the organization may be an amplifier of pulse waves. If the two above voltages are both sinusoidal, the output will contain not only the two fundamental frequencies but also their modulation products because of the non-linear amplitude characteristic of the crystal. The organization can thus be used as a modulator in the usual sense, or, if all the frequencies except the signal frequency be filtered out, the output will be an amplified version of the input signal and in this way is a simple amplifier.

In Fig. 5 the vacuum tube closure member 17 is comparable to the closure member of the conventional vacuum tube. A vacuum tube is here necessary, as it was not in the earlier numbered figures which illustrate apparatus utilizing alpha and beta particles, because here the charged particles are electrons emanating from the usual cathode source as in conventional vacuum tubes. Reference numeral 18 indicates generally an electron gun of a type which is customary in vacuum tubes which generate and utilize a conformed cathode ray or beam. The gun conforms and directs the beam so as to impinge on the solid insulator 20 through diaphragm-like element 19, which functions similarly, for example, as element 12 in Fig. 3. The conditions affecting this solid insulator are similar to those specific to the earlier disclosed species of the invention, the impingement of the electrons being reflected in amplified form as the bombardment induced current inherent in the operation. In a particular experiment by applicant, a diamond was used which was coated with two narrowly separated electrodes constituted by evaporated gold on the diamond face presented to the incident electron beam which were interconnected so as effectively to constitute a single electrode, together with one similar electrode on the opposite face of the diamond. Alternatively, other arrangements of dielectric and electrodes may be used within the teachings of the earlier numbered figures and, in addition, there is a wide choice of solid insulator material.

The electron gun in question, as specifically disclosed in Fig. 5, conforms to conventional practice for such electron guns as used for a variety of purposes. The particular gun shown, in fact, conforms to a well-known Radio Corporation of America technique as illustrated in some of their tubes. Something very much like it is also disclosed in application of R. W. Sears, Serial No. 715,900, filed December 13, 1946, now Patent 2,458,652, issued January 11, 1949, in which see either Fig. 1 or Fig. 8. The cathode 21 may be indirectly heated, as disclosed, or be of the filamentary type. The electron emanations are urged outwardly and concentrated by anode 22, beyond which the beam passes to the diamond crystal 20 as has been disclosed. Electrode 23 is the grid or control device on which, as will be shown in Fig. 6, the signal wave to be amplified is impressed. By it a true density modulation of the electrons in the beam is achieved, as distinguished from the alternative arrangement of Fig. 6 of the prototype Wooldridge application in which the modulation is achieved by playing a beam across the crystal so as to change the concentration of electrons incident on the crystal. Associated with the anode 22, or supplementing it, are the focussing and accelerating electrodes 24 and 25, the latter in two parts as shown each comprising a perforated disk-like structure. The deflection plates 26 cooperate with each other and with the other gun structure, for directing the electron beam. Silver accelerating rings 27 are formed by deposit on the inner wall of the vacuum tube. Their function is similar to that of other elements shown as contributing to the concentrating and forming function. All of the structure which affects the electron beam, as shown in Fig. 5, has been found useful by applicant in the amplifier of this disclosure although, as should be obvious, and as will be indicated in Fig. 6 disclosing a practical organization using this vacuum tube, not all of the elements here disclosed are necessary. The particular connections of the gun elements and the silver accelerating rings to their corresponding source, and therefore the ordering of the relative potentials, are not shown because, partly, they are quite obvious from the prior art but also because Fig. 6 will show the connections of the more essential parts of the structure. The above Sears application has a detailed disclosure of the electrical connections of this structure.

In Fig. 6 the amplifier organization contemplated by Fig. 5 is disclosed. Therein parts corresponding to those disclosed in Fig. 5 are identically designated. The showing is more or less diagrammatic as to the parts taken from Fig. 5, both as to their particular showing and as to the choice of parts to be so disclosed. The circuits may be greatly elaborated if desired, and in an obvious way, from the above description, with resultant benefit in special circumstances. The essential electron gun elements and their interconnections and the necessary provision for establishing their potentials are shown in this figure. As representing what is old in the art, no further description is deemed necessary. The signal source 28 provides means for impressing a signal wave on the grid 23 to permit the operation of the amplifier organization as above described. That is, the signal wave, of whatever form impressed, density modulates the electron stream and therefore correspondingly varies the number of electrons incident on the diamond crystal 20. The electron bombardment induced conductivity therein is reflected by a correspondingly varying current in lead 29. The electric field across the crystal electrodes, which cooperates, as has been explained, with the electrons penetrating the crystal, to achieve the bombardment induced conductivity effect, results from the use of the alternating voltage source 30, which, as has been described, may suit a variety of conditions as to a particular wave shape of the voltage involved. This is a very important ingredient of the invention, as pointed out in the statement of invention, as very greatly increasing the yield over the alternative using direct potential.

Under the conditions of one experiment, that is with the primary beam current of one microampere, pulse length of one microsecond, recurrence frequency 4000 cycles per second, an alternating voltage of frequency as low as 20 cycles per second applied across the crystal was sufficient to prevent the formation of large opposing polarization fields which would substantially reduce the internal yield. Thus the instantaneous current due to conduction by electrons obtained at a given peak alternating voltage applied field was approximately ten times that obtained with the same direct voltage field across the crystal.

The maximum value of the voltage which can be applied across the crystal is, as a practical matter, and in the case of a direct voltage source, set by the amplitude of the initial large fluctuation current through or across the surface of the crystal upon connection of the source to the electrodes. The corresponding maximum peak alternating voltage was found to be several times this limiting maximum direct voltage and this contributed to the favorable results achieved. For example, using 14 kilovolts bombarding electrons at a peak alternating voltage of about 1170 volts across the crystal, a positive internal yield of the equivalent of 580 conduction electrons passing completely through the crystal for each bombarding electron has been obtained, where a positive yield is defined as that in which the conduction electrons travel in the same direction through the crystal as do the bombarding electrons.

It should be understood that the amplifying action here concerned has no relationship to the amplifying action inherent in a conventional vacuum tube, which the organization would somewhat resemble without the diamond crystal. On the contrary, the amplifying action results from the inherent ability of the solid dielectric under the conditions imposed to become conductive when bombarded by the electrons. The impressed signal wave partakes of this amplification, the eventual conductivity current reflecting, in amplified form, said signal wave. The device can be used as a modulator by utilizing the non-linear amplitude characteristic of the crystal. The conductivity current in lead 29 may be amplified by element 31 and indicated by oscilloscope or the like 32, similarly as in the earlier numbered figures. It is assumed that the amplifier as here shown diagrammatically may be elaborated as desired to determine a particular type of output, depending on whether straight amplification or modulation is desired. Of course other types of translating device than the oscilloscope disclosed, may be used. The showing here used represents the set-up of an experiment especially performed by applicant to demonstrate the existence of the amplifying action.

Figure 7:
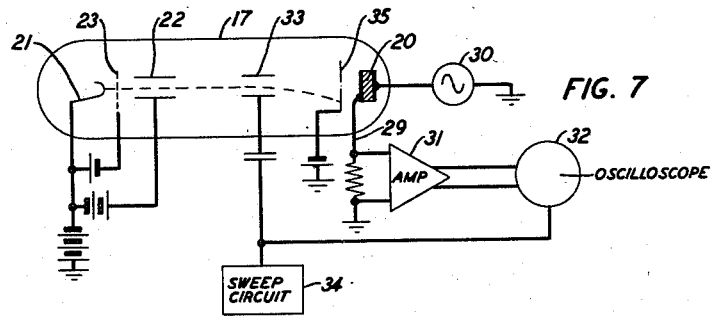
Fig. 7 illustrates the application of the bombardment induced conductivity principle of the invention to a pulse generator.

Fig. 7 illustrates a variant of the amplifier of Fig. 6 adapting it for use especially as a pulse generator. In this figure elements similar to those of Fig. 6 are similarly identified. The electron gun may be the same except that here the grid is not impressed by a signal wave. In fact, the organization functions as a prime source of pulses, rather than as a means for amplifying or conditioning an impressed wave. The electron beam is swept by potentials impressed from sweep facility 34 on deflecting plates 33, which might well be one of the pairs of deflecting plates 26 of the tube disclosed in Fig. 5. The path described by the beam intercepts the defining aperture in the shield 35, thus permitting a short burst of electrons to strike the diamond crystal during each phase of movement of the deflected beam. The corresponding bombardment induced current in the diamond is utilized as disclosed, which is similar to the organization of Fig. 6. That is, it may be amplified and indicated by an oscilloscope or the like.

In an experimental demonstration a beam of a few microamperes was so deflected. Pulse durations ranging from $\frac{1}{10}$ microsecond up to several milliseconds were obtained although a much wider range of durations could be obtained. The use of electron bombardment induced conductivity enables one to use a small primary beam current giving a well-focussed beam, and at the same time permits one to obtain a relatively large pulse in the output circuit. In order to make possible the efficient use of the oscilloscope in this set-up, of course, the sweep of the beam must be synchronized with, or used simultaneously as, the sweep for the oscilloscope; that is, a common sweep source may be used, as illustrated. If, further, the alternating voltage impressed on the crystal electrodes is synchronized with the sweep frequency with the additional requirement that provision be made for bombardment of the crystal at some time during both positive and negative half cycles, or multiple thereof, of the alternating voltage, the observed pulses are of equal amplitude; if not, a series of pulses of different amplitudes will be observed, each corresponding to a certain phase of the alternating voltage impressed on the crystal.

Figure 8:
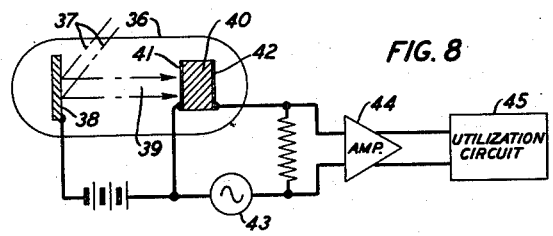
Fig. 8 illustrates the application of the bombardment induced conductivity principle to a photomultiplier.

Fig. 8 discloses very diagrammatically a photomultiplier application of bombardment induced conductivity in a diamond. It is somewhat similar to the apparatus disclosed in the earlier numbered figures, the essential elements being enclosed in evacuated envelope 36. The significant particles are photoelectrons, as distinguished from electrons emitted from a heated cathode, as in the earlier figures. A light beam, from whatever available source, is represented in the drawing by the two lines or rays 37 which are incident on a conventional surface 38 adapted for the efficient emission of photoelectrons under such conditions. Reference numeral 39 indicates the path of two typical photoelectrons emitted from said surface and which impinge on the exposed surface of the diamond crystal 40, having electrodes 41 and 42 which crystal corresponds to the diamond crystals used in other bombardment induced conductivity applications described in this specification. Said photoelectrons are accelerated by the voltage indicated between the emitter and electrode 41 of said diamond crystal so as to bombard the diamond with an energy of one thousand electronvolts or more.

The conditions specific to the diamond are similar to those relative to the diamonds described in connection with other applications of bombardment induced conductivity. That is, the current induced therein with the cooperation of the alternating voltage field derived from the source 43 is about one hundred times the bombarding current of photoelectrons. This current flows through the output circuit, here indicated diagrammatically by the amplifier 44 and utilization circuit 45. In extent it is the equivalent to what would be expected of a secondary emission surface twenty times more efficient than those employed in conventional photomultiplier tubes. As is true of other applications of the basic principles disclosed in the earlier numbered figures other solid insulating materials than diamond may be used and other modifications may be made as taught in the earlier portions of this specification.

Figure 9:
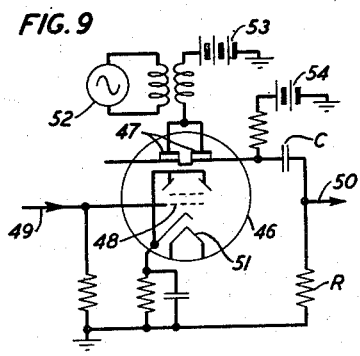
Fig. 9 illustrates the application of the above principle of the invention to a high gain amplifier.

Fig. 9 illustrates a high gain amplifier of the invention, high gain because of the inherent effective transconductance $g_m$ superposed on the transconductance $g_m$ of the tube circuit with which it is used, which tube may be a conventional type of high $g_m$ beam-pentode with the diamond crystals of the invention replacing the conventional plates thereof, as will be described. With a beam-pentode $g_m$ of five thousand micromhos and with a crystal gain of at least ten, as has been taught by the earlier part of this specification, the organization has an effective $g_m$ of fifty thousand micromhos and with practically no increase in undesirable capacity effect.

In Fig. 9 the tube 46 and its contents, as characterized above, may be a conventional beam-pentode tube except for the replacement of the plates thereof by the solid insulators of the invention, assumed to be diamond crystals in the instant case. The adaptation of the beam-pentode is not a rigid requirement, although urged by the fact that it has a small volume although characterized by a high $g_m$, and by the fact that its use of discrete plates (the electron receivers) while retaining much of the benefit of a complete cylindrical plate, easily lends itself to the use of the solid insulators of the invention to replace the plates. It should be noted however that, consistently with the fact that a beam-pentode type of a tube is not necessary, it is also not necessary to employ two solid insulators. It should be also understood that the beam type of tube as shown in Fig. 9 is highly diagrammatic and that actually the two diamond crystals, simulating the conventional plates, would, in a cross section of the tube, occur on opposite sides of the center, the other elements here shown below the diamond crystals being likewise not shown accurately in their geometrical relationships.

The signal wave to be amplified, contemplated as a continuously modulated wave (rather than as a pulse wave, for example) or any other type of continuous wave, is impressed on a conventional control grid 48 from circuit 49. The output wave is taken off by circuit 50 which is related to the diamonds 47 (corresponding to the normal anode or plates of the beam-pentode) and the cathode 51 through condenser C and resistance R. Impedances C and R, besides perfecting the proper impedance relationships for efficient energy translation, have such values as effectively to filter out or reject the relatively low frequency wave from source 52. The alternating voltage from said source 52, as reflected in a corresponding alternating voltage across the diamonds, is perhaps the most essential feature of the invention as to this species. As has been explained with reference to other species of the invention, it very greatly promotes the action of bombardment induced conductivity in the diamonds and, here, effectively increases the gain of the amplifier, as otherwise constituted, by a factor of at least ten. Owing to the non-linear characteristics of the crystal or crystals, this output wave consists of a component of the signal frequencies, a component of the alternating current field frequency arising from source 52, and intermodulation products of these frequencies. Means for utilization of the signal frequencies component, obtained directly or by demodulation, are well known in the prior art.

While it is essential, according to the invention, that alternating potentials be thus impressed across the diamonds (or diamond if only one is used) it may well be that this alternating voltage will be found to be superposed on a net direct voltage, depending on the relative values of the direct voltages from sources 53 and 54. Source 54 of course is necessary on the diamond electrodes facing the cathode to insure bombardment of the diamonds by electrons having an adequate velocity. It therefore functions somewhat as the plate source in the prototype beam-pentode. The function of source 53 is to provide the most suitable relation between the peak positive and peak negative voltages of the alternating field applied across the crystal to obtain optimum induced conductivity consistent with the particular mode of operation of the amplifier tube. The actual values of the potential sources will depend upon the circuit constants, the properties of the tube and the properties of the crystal or crystals.

What is claimed is:

1. A method of inducing electrical conductivity in a solid insulator, which comprises impressing radiation on said insulator while applying an alternating voltage field thereacross.

2. A method of inducing electrical conductivity in a solid insulator, which comprises bombarding said insulator with electrically charged particles while applying an alternating voltage field thereacross.

3. A method of inducing electrical conductivity in a solid insulator, which comprises irradiating said insulator with electromagnetic radiation while applying an alternating voltage field thereacross.

4. A method of inducing electrical conductivity in a solid insulator, which comprises creating an alternating voltage electric field in said insulator and bombarding said insulator with electrically charged particles first in the course of a positive half-cycle of said field followed by bombardment in the course of a negative half-cycle thereof.

5. A method of inducing electrical conductivity in a solid insulator, which comprises bombarding said insulator with electrically charged particles at least during certain time intervals, applying an electric field across said insulator while being so bombarded, reversing the direction of said field while the insulator is still being subjected to bombardment, and continuing said recurrent changes of field at a periodicity determined by the rate of development of a space charge within the insulator from the electrons and ions freed within said insulator, while observing the current flow in said insulator resulting from the induced conductivity.

6. The method of inducing electrical conductivity in an insulator which comprises bombarding said insulator with electrically negative particles while applying an alternating voltage field thereacross.

7. The method of inducing electrical conductivity in an insulator which comprises bombarding said insulator with alpha particles while applying an alternating voltage field thereacross.

8. The method of inducing electrical conductivity in an insulator which comprises bombarding said insulator with beta particles while applying an alternating voltage field thereacross.

9. The method of imparting electrical conductivity to a body of diamond material which comprises bombarding said body with electrically charged particles while applying an alternating voltage field thereacross.

10. The method of inducing electrical conductivity in a diamond crystal which comprises applying an electric field to said crystal, subjecting the crystal to incident electrically charged particles at least during certain time intervals so as to cause internal ionization therein, reversing the direction of said field while the crystal is so subject to said charged particles, and recurrently reversing the field at a periodicity no greater than the time required for the development of a space charge from the trapping of charged particles previously released within the crystal, while continuing to subject the crystal to said incident charged particles.

11. In combination, an electrical insulator, means for applying an alternating voltage field across at least a portion of said insulator, means for bombarding said insulator with electrically charged particles, and a current responsive means in circuit with said field impressing means for indicating the resultant bombardment induced current in said insulator.

12. In combination, an electrical insulator, means for applying an electric field across at least a portion of said insulator, means for bombarding said insulator with electrically charged particles, and a current responsive means in circuit with said field impressing means for indicating the resultant bombardment induced current in said insulator, the spacing between said field applying means being so small as to approach the depth of penetration of said particles and the field thereacross therefore being extremely large.

13. The combination recited in claim 12 in which said field is an alternating voltage field.

14. In combination, an electrically insulating crystal, two conducting electrodes applied to separated portions of the surface of said crystal, a circuit connecting said electrodes and including a source of alternating voltage for impressing a similar field across the crystal and a current responsive means, and means for bombarding said crystal with electrically charged particles, said current responsive means being adapted to respond to current pulses corresponding individually to the incidence of corresponding charged particles.

15. The combination recited in claim 14 in which said current responsive means comprises an amplifier and a counting device connected in cascade.

KENNETH G. McKAY.

REFERENCES CITED

The following references are of record in the file of this patent:

UNITED STATES PATENTS

| Number | Name | Date |
|---|---|---|
| 1,932,637 | Richardson | Oct. 31, 1933 |
| 2,245,174 | Banks | June 10, 1941 |
| 2,391,967 | Hecht | Jan. 1, 1946 |
| 2,408,230 | Shoupp | Sept. 24, 1946 |

Certificate of Correction

Patent No. 2,543,039 — February 27, 1951

KENNETH G. McKAY

It is hereby certified that error appears in the printed specification of the above numbered patent requiring correction as follows:

Column 1, line 6, for "Patent 2,453,131" read *Patent 2,537,388*;

and that the said Letters Patent should be read as corrected above, so that the same may conform to the record of the case in the Patent Office.

Signed and sealed this 22nd day of May, A. D. 1951.

[SEAL]

THOMAS F. MURPHY,
*Assistant Commissioner of Patents.*